United States Patent
Mitran et al.

(10) Patent No.: US 8,819,647 B2
(45) Date of Patent: Aug. 26, 2014

(54) PERFORMANCE IMPROVEMENTS FOR NESTED VIRTUAL MACHINES

(75) Inventors: Marcel Mitran, Markham (CA); Ali I. Sheikh, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1510 days.

(21) Appl. No.: 12/019,702

(22) Filed: Jan. 25, 2008

(65) Prior Publication Data

US 2009/0193399 A1 Jul. 30, 2009

(51) Int. Cl.
*G06F 9/45* (2006.01)

(52) U.S. Cl.
USPC .............................. 717/136; 717/140; 717/151

(58) Field of Classification Search
None
See application file for complete search history.

(56) References Cited

U.S. PATENT DOCUMENTS

| | | | | |
|---|---|---|---|---|
| 4,456,954 A * | 6/1984 | Bullions et al. | ............... | 711/207 |
| 4,792,895 A * | 12/1988 | Tallman | ............................ | 718/1 |
| 5,317,750 A * | 5/1994 | Wickersheim et al. | ......... | 712/39 |
| 5,530,820 A * | 6/1996 | Onodera | ............................ | 718/1 |
| 6,075,938 A * | 6/2000 | Bugnion et al. | ................ | 703/27 |
| 6,341,372 B1 * | 1/2002 | Datig | ............................ | 717/136 |
| 6,374,403 B1 * | 4/2002 | Darte et al. | .................... | 717/151 |
| 6,397,242 B1 * | 5/2002 | Devine et al. | ..................... | 718/1 |
| 6,779,175 B2 * | 8/2004 | Susnjara | ....................... | 717/136 |
| 6,817,013 B2 * | 11/2004 | Tabata et al. | ................... | 717/130 |
| 7,100,154 B2 * | 8/2006 | Hicks | ........................... | 717/148 |
| 7,124,407 B1 * | 10/2006 | Wallman | ........................ | 717/151 |
| 7,140,009 B2 * | 11/2006 | Tal et al. | ........................ | 717/151 |
| 7,401,178 B1 * | 7/2008 | Tene et al. | ......................... | 711/6 |
| 7,536,688 B2 * | 5/2009 | Tene et al. | ......................... | 718/1 |
| 7,661,096 B2 * | 2/2010 | Meijer et al. | ................... | 717/140 |
| 7,716,654 B2 * | 5/2010 | Fleming et al. | ............... | 717/138 |
| 7,770,159 B2 * | 8/2010 | Pepin et al. | .................... | 717/140 |
| 7,937,694 B2 * | 5/2011 | Meijer et al. | ................... | 717/140 |
| 7,954,094 B2 * | 5/2011 | Cascaval et al. | .............. | 717/145 |
| 8,387,031 B2 * | 2/2013 | Inglis et al. | .................... | 717/136 |
| 8,397,222 B2 * | 3/2013 | Warren | ......................... | 717/140 |
| 2004/0172629 A1 * | 9/2004 | Tene et al. | ......................... | 718/1 |
| 2005/0028132 A1 * | 2/2005 | Srinivasamurthy et al. | .. | 717/100 |
| 2005/0102671 A1 * | 5/2005 | Baumberger | ..................... | 718/1 |
| 2005/0183071 A1 * | 8/2005 | Meijer et al. | ................... | 717/140 |
| 2006/0206892 A1 * | 9/2006 | Vega et al. | ......................... | 718/1 |
| 2007/0050764 A1 * | 3/2007 | Traut | ................................ | 718/1 |
| 2007/0074195 A1 * | 3/2007 | Liao et al. | ....................... | 717/151 |
| 2007/0089111 A1 | 4/2007 | Robinson et al. | ................. | 718/1 |
| 2007/0220217 A1 | 9/2007 | Shankara | ....................... | 711/154 |
| 2008/0127125 A1 * | 5/2008 | Anckaert et al. | .............. | 717/136 |
| 2010/0192137 A1 * | 7/2010 | Inglis et al. | .................... | 717/136 |

OTHER PUBLICATIONS

Ford, et al., "Microkernels Meet Resursive Virtual Machines", In 2nd Symposium on Operating Systems Design and Implementation (1996); [retrieved on Sep. 19, 2011]; Retrieved from Internet <URL:http:/citeseerx.ist.psu.edu/viewdoc/download?doi=10.1.1.40.7950&rep=rep1&type=pdf>; pp. 1-15.*

(Continued)

*Primary Examiner* — Xi D Chen
(74) *Attorney, Agent, or Firm* — Steven Chiu, Esq.; Blanche E. Schiller, Esq.; Heslin Rothenberg Farley & Mesiti P.C.

(57) ABSTRACT

Nested virtual machines cooperate with one another to improve system performance. In particular, an outer virtual machine performs tasks on behalf of an inner virtual machine to improve system performance. One such task includes translation of instructions for the inner virtual machine.

20 Claims, 6 Drawing Sheets

(56) References Cited

OTHER PUBLICATIONS

Singer, et al., "Supporting Higher-Order Virtualization", 2006, published online. [retrieved on Jan. 27, 2012]; Retrieved from Internet <URL:ftp://ftp.cs.man.ac.uk/pub/apt/papers/JS_CPC06_06.pdf>;pp. 1-25.*

Ford, et al., "Microkernels Meet Recursive Virtual Machines", 1996, OSDI—usenix.org; [retrieved on Aug. 19, 2013]; Retrieved from Internet <URL:http://citeseerx.ist.psu.edu/viewdoc/download?doi=10.1.1.40.7950&rep=rep1&type=pdf>;pp. 1-15.*

Smith, Nair, "The Architecture of Virtual Machines", 2005, IEEE; [retrieved on Aug. 19, 2013]; Retrieved from Internet <URL:http://www.ittc.ku.edu/~kulkarni/teching/archieve/EECS800-Spring-2008/smith-nair.pdf>;pp. 32-38.*

Bugnion, et al., "Bringing Virtualization to the x86 Architecture with the Original VMware Workstation"; 2012 ACM; [retrieved on Dec. 25, 2013]; Retrieved from Internet <URL:http://dl.acm.org/citation.cfm?id=2382553>;pp. 12:01-12:51.*

Lee, et al., "Enhanced Hot Spot Detection Heuristics for Embedded Java Just-in-Time Compilers"; 2008, ACM; [retrieved on Dec. 25, 2013]; Retrieved from Internet <URL:http://dl.acm.org/citation.cfm?id=1375657>;pp. 13-22.*

Siddique, et al., "ILJc: Porting Microsoft.NET IL (Intermediate Language) to Java", 2006, IEEE; [retrieved on Dec. 25, 2013]; Retrieved from Internet <URL:http://ieeexplore.ieee.org/stamp/stamp.jsp?tp=&arnumber=4216568>;pp. 119-121.*

Smith, et al., "Achieving High Performance via Co-Designed Virtual Machine"; 1999 IEEE; [retrieved on Dec. 25, 2013]; Retrieved from Internet <URL:http://ieeexplore.ieee.org/stamp/stamp.jsp?tp=&arnumber=779076>; pp. 77-84.*

"Z/Architecture—Principles of Operation," International Business Machines Corporation, SA22-7832-04, Fifth Edition (Sep. 2005).

"Overview of the IBM Java Just-in-Time Compiler," Suganuma et al., IBM Systems Journal, vol. 39, No. 1, 2000.

"A Framework for Reducing Instruction Scheduling Overhead in Dynamic Compilers," Tang et al., Proceedings of the 2006 Conference of the Center for Advanced Studies on Collaborative Research, Article No. 5, 2006 (Abstract Only).

"A Dynamic Optimization Framework for a Java Just-in-Time Compiler," Suganuma et al., ACM SIGPLAN, vol. 36, Issue 11, Nov. 2001, pp. 180-194.

"Memory Resource Management in VMware ESX Server," Carl A. Waldspurger, Proceedings of the 5th Symposium on Operating Systems Design and Implementation, Dec. 2002.

"A Communication Virtual Machine," Deng et al., Computer Software and Applications Conference, Sep. 2006, vol. 1, pp. 521-531.

* cited by examiner

PERFORMANCE IMPROVEMENTS FOR NESTED VIRTUAL MACHINES

TECHNICAL FIELD

This invention relates, in general, to using nested virtual machines to facilitate processing within a computing environment, and in particular, to improving performance of such nested virtual machines.

BACKGROUND OF THE INVENTION

A virtual machine is, for instance, software code that creates a virtual environment where a particular type of computer environment is emulated. A virtual machine may also be called an emulator or an interpreter. As one example, the JAVA™ virtual machine is software that emulates an environment where programs written in the JAVA programming language can be executed. JAVA is a trademark of Sun Microsystems, Inc., Santa Clara, Calif.

Similarly, other languages, such as C#, Ruby, Python, etc., run inside their own respective virtual environments. Moreover, there are other types of virtual machines that emulate an entire computing architecture. For example, there exists virtual machines that emulate the Intel® IA32 architecture (e.g., QEmu, VMWare).

Today, virtualization is becoming an even more important part of the computing spectrum. Virtual machines are very prevalent and are continually growing in popularity. Virtual machines can run independent of one another or one virtual machine can run on another virtual machine (i.e., nested virtual machines).

SUMMARY OF THE INVENTION

With the ever increasing popularity of virtual machines, and in particular, nested virtual machines, a need exists for a capability to improve the performance of nested virtual machines. As a particular example, a need exists for a capability to improve the performance of nested virtual machines that dynamically translate instructions.

The shortcomings of the prior art are overcome and additional advantages are provided through the provision of an article of manufacture that includes at least one computer usable medium having computer readable program code logic to facilitate translation of computer instructions. The computer readable program code logic for execution by a computer for performing a method including, for instance: receiving, by an outer virtual machine of a computing environment, an instruction from an inner virtual machine of the computing environment, wherein the inner virtual machine is running on the outer virtual machine; and translating by the outer virtual machine the instruction to a native architecture of the outer virtual machine.

In a further aspect, an article of manufacture that includes at least one computer usable medium having computer readable program code logic to facilitate processing within a computing environment is provided. The computer readable program code logic for execution by a computer for performing a method including, for instance: receiving, by an outer virtual machine of a computing environment, a communication from an inner virtual machine of the computing environment, the outer virtual machine and the inner virtual machine cooperating with one another, wherein the inner virtual machine is running on the outer virtual machine and wherein the inner virtual machine is of a different architecture than the outer virtual machine; and performing a task by the outer virtual machine based on the communication, the task related to improving performance of the computing environment.

Methods and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, a capability is provided for improving performance of nested virtual machines. In particular, a capability is provided that enables nested virtual machines to communicate and cooperate with one another. As one example, the nested virtual machines cooperate with one another in performing dynamic translation of instructions in order to improve performance of the virtual machines, and therefore, performance of the overall processing environment.

Although in the embodiment described herein the virtual machines cooperate to provide efficiencies in dynamic translation of instructions, in other embodiments, they may cooperate to provide other efficiencies in the management and/or processing of a processing environment, such as in memory management or garbage collection, as examples.

Figure 1:
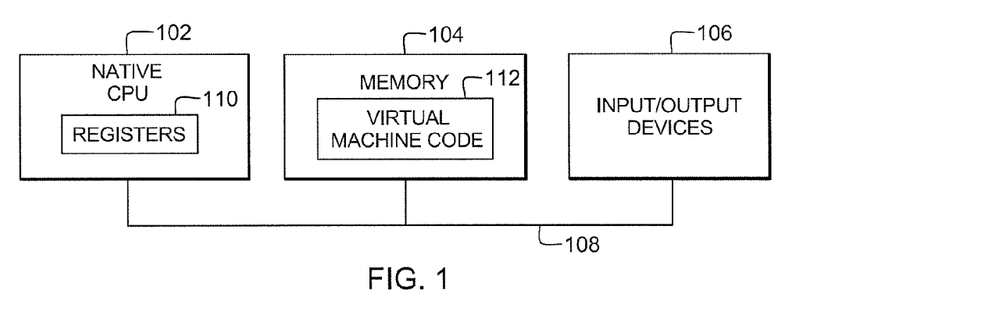
FIG. 1 depicts one embodiment of a processing environment to incorporate and use one or more aspects of the present invention.

One embodiment of a processing environment to incorporate and use one or more aspects of the present invention is described with reference to FIG. 1. In this example, a processing environment 100 is based on one architecture, which may be referred to as a native architecture, but emulates another architecture, which may be referred to as a guest architecture. As examples, the native architecture is the Power4 or PowerPC® architecture offered by International Business Machines Corporation, Armonk, N.Y.; and the guest architecture is the Intel® IA32 architecture offered by Intel Corporation or the z/Architecture® offered by International Business Machines Corporation. Aspects of the z/Architecture® are described in "z/Architecture—Principles of Operation," IBM Publication No. SA22-7832-04, September 2005, which is hereby incorporated herein by reference in its entirety.

Processing environment 100 includes, for instance, a native processor 102 (e.g., a central processing unit (CPU)), a memory 104 (e.g., main memory) and one or more input/output (I/O) devices 106 coupled to one another via, for example, one or more buses 108. As examples, processor 102 is a part of a pSeries® server offered by International Business Machines Corporation (IBM®), Armonk, N.Y. IBM®, pSeries®, Power PC® and z/Architecture® are registered trademarks of International Business Machines Corporation, Armonk, N.Y., U.S.A. Intel® is a registered trademark of Intel Corporation. Other names used herein may be registered trademarks, trademarks or product names of International Business Machines Corporation or other companies.

Native central processing unit 102 includes one or more native registers 110, such as one or more general purpose registers and/or one or more special purpose registers, used during processing within the environment. These registers include information that represent the state of the environment at any particular point in time.

Moreover, native central processing unit 102 executes instructions and code that are stored in memory 104. In one particular example, the central processing unit executes virtual machine (VM) code (also referred to as emulator code) 112 stored in memory 104. This code enables the processing environment configured in one architecture to emulate another architecture. For instance, virtual machine code 112 allows machines based on architectures other than the Intel® IA32 architecture, such as pSeries® servers, to emulate the Intel® IA32 architecture and to execute software and instructions developed based on the Intel® IA32 architecture.

Figure 2:
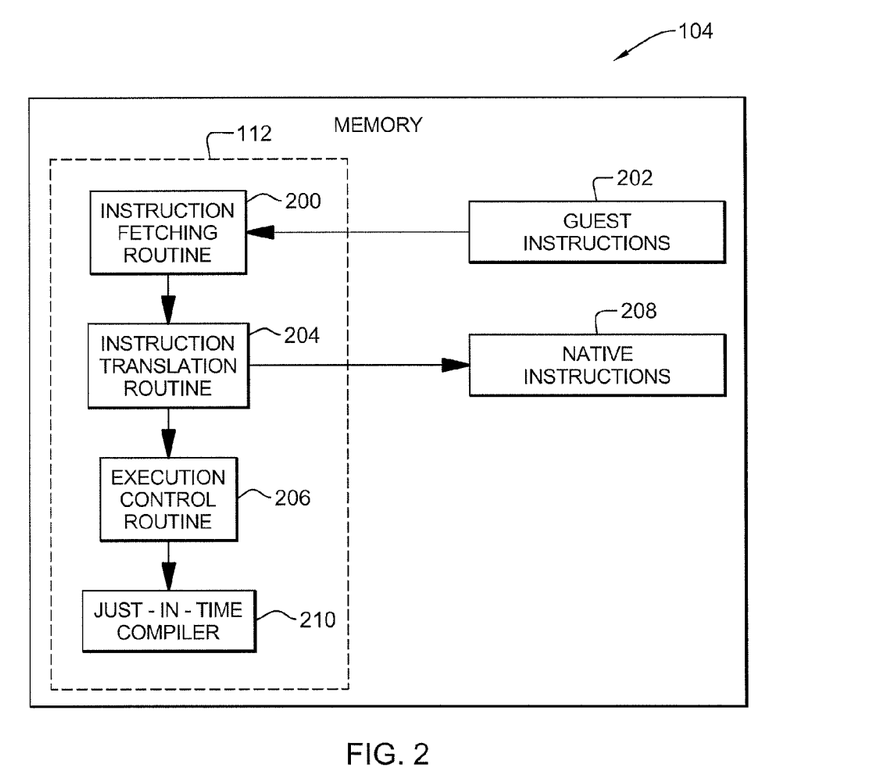
FIG. 2 depicts further details of one embodiment of the memory of FIG. 1, in accordance with an aspect of the present invention.

Further details relating to virtual machine code 112 are described with reference to FIG. 2. In one example, virtual machine code 112 includes an instruction fetching routine 200 to obtain one or more guest instructions 202 from memory 104, and to optionally provide local buffering for the one or more obtained instructions. Guest instructions 202 comprise software instructions (e.g., machine instructions) that were developed to be executed in an architecture other than that of native CPU 102. For example, guest instructions 202 may have been designed to execute on an Intel® IA32 architecture processor, but are instead being emulated on native CPU 102, which may be, for instance, a pSeries® server.

Virtual machine 112 also includes an instruction translation routine 204 to determine the type of guest instruction that has been obtained and to translate the guest instruction into one or more corresponding native instructions 208. This translation includes, for instance, identifying the function to be performed by the guest instruction and choosing the native instructions to perform that function.

Further, VM 112 includes an execution control routine 206 to cause the native instructions to be executed. Execution control routine 206 may cause native CPU 102 to execute a routine of native instructions that emulate one or more previously obtained guest instructions and, at the conclusion of such execution, to return control to the instruction fetching routine to emulate the obtaining of the next guest instruction or guest instructions. Execution of native instructions 208 may include loading data into a register from memory 104; storing data back to memory from a register; or performing some type of arithmetic or logical operation, as determined by the translation routine.

Each routine is, for instance, implemented in software, which is stored in memory and executed by native central processing unit 102. In other examples, one or more of the routines or operations are implemented in firmware, hardware, software or some combination thereof. The registers of the emulated guest processor may be emulated using registers 110 of the native CPU or by using locations in memory 104. In one or more embodiments, guest instructions 202, native instructions 208, and VM code 112 may reside in the same memory or may be dispersed among different memory devices. The process of execution of each of these routines successively is called interpretation.

An accumulation of instructions that have been processed by the fetch and control routines is further provided, in one embodiment, to a Just-In-Time compiler 210. The Just-In-Time compiler is a dynamic compiler that examines the instructions, looks for opportunities to remove redundancies and generates a matching sequence of instructions on the native platform on which the virtual machine is running. While the virtual machine has visibility to one instruction at a time, the Just-In-Time compiler has visibility to a sequence of instructions. Since it has visibility to a sequence of instructions, it can attempt to look for redundancies in the sequence of instructions and remove them. One example of a Just-In-Time compiler is the JAVA™ Just-in-Time (JIT) compiler offered by International Business Machines Corporation, Armonk, N.Y.

An overview of the JAVA JIT compiler is described in "Overview of the IBM Just-in-Time Compiler," T. Suganuma et al., Volume 39, Number 1, 2000, http://www.research.ibm.com/journal/sj/391/suganuma.html, which is hereby incorporated herein by reference in its entirety. Aspects of a JIT compiler are also described in, for instance, "A Framework For Reducing Instruction Scheduling Overhead In Dynamic Compilers," V. Tang, J. Siu, A. Vasilevskiy, M. Mitran, Proceedings of the 2006 Conference of the Center for Advanced Studies on Collaborative research, Article 5, 2006; "A Dynamic Optimization Framework For A Java Just-In-Time Compiler," T. Suganuma, T. Yasue, M. Kawahito, H. Komatsu and T. Nakatani, ACM SIGPLAN, Volume 36, Issue 11, November 2001; and "Memory Resource Management in VMware ESX Server," C. A. Waldspurger, In Proc. Fifth Symposium on Operating Systems Design and Implementation (OSDI '02), December 2002, each of which is hereby incorporated herein by reference in its entirety.

Additional details regarding virtual machine 112 are further described below. Typically, virtual machines work by interpreting or emulating the instructions of an instruction set one by one. However, as described above, some virtual machines incorporate a dynamic translator (e.g., JIT) that translate a sequence of instructions. The JIT translates the virtual machine instructions down to the native instruction set of the computing environment that the virtual machine is running on. For example, the JAVA™ virtual machine incorporates a JIT that translates the JAVA bytecode instructions to the native instruction set of the hardware that the VM is running on.

Figure 3:
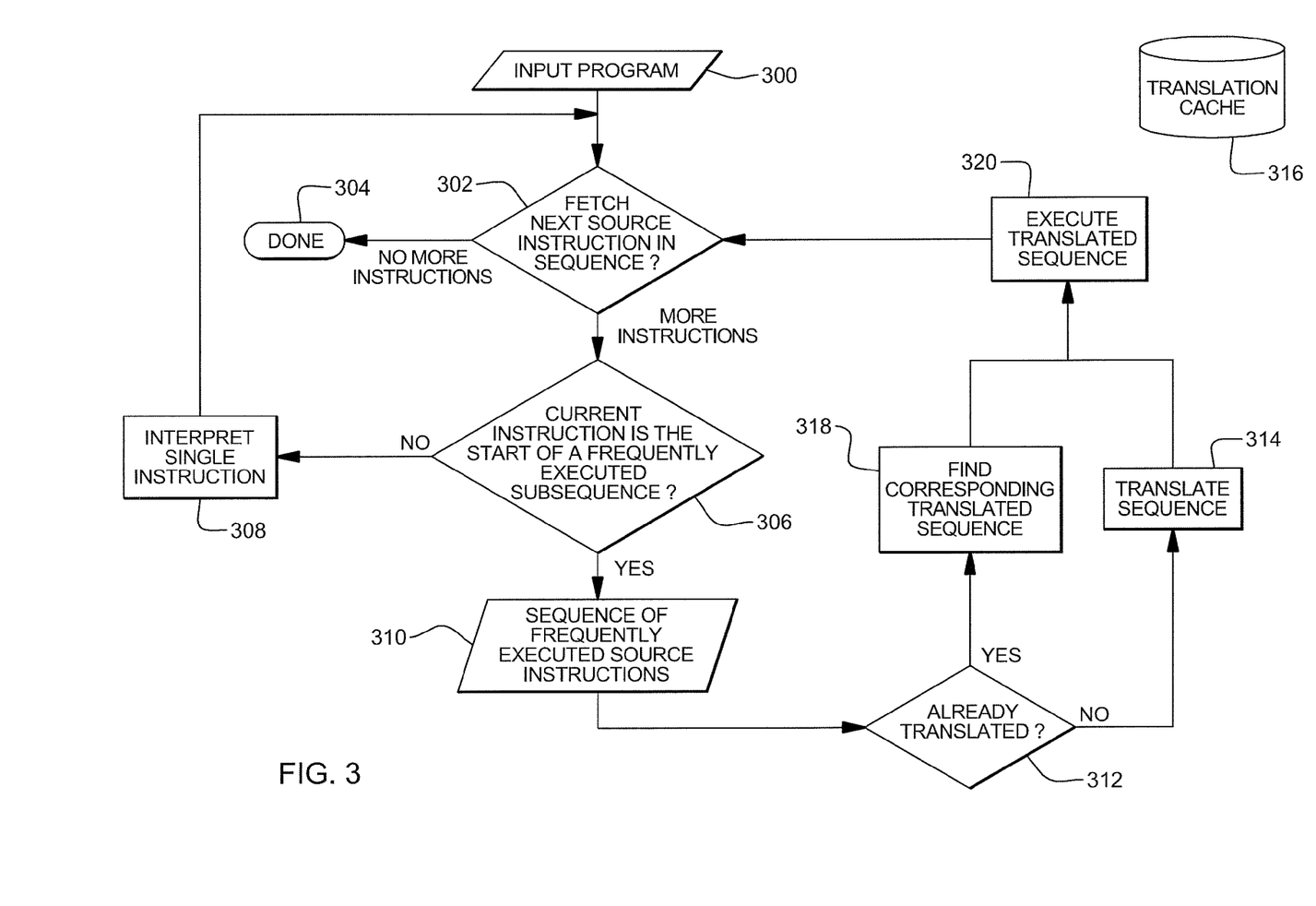
FIG. 3 depicts one embodiment of the operation of a virtual machine that incorporates a Just-In-Time compiler (JIT), in accordance with an aspect of the present invention.

One embodiment of the logic associated with the operation of a VM that incorporates a JIT is described with reference to FIG. 3. Initially, a program is input to the virtual machine, STEP 300. Then, a determination is made as to whether the next source instruction in the sequence is to be fetched, INQUIRY 302. If there are no more instructions to be fetched, then processing is complete, STEP 304. However, if there is at least one more instruction to be fetched, that instruction is fetched and a determination is made as to whether the current instruction is the start of a frequently executed subsequence of instructions, INQUIRY 306. As examples, this determination is made by checking a cache of frequently executed instructions or by maintaining execution counters associated with each instruction. If the fetched instruction is not the start of a frequently executed subsequence of instructions, then the single instruction is interpreted, STEP 308. Processing then continues at INQUIRY 302.

Returning to INQUIRY 306, if the current instruction is the start of a frequently executed subsequence of instructions, then the sequence of frequently executed source instructions is fetched, STEP 310, and a determination is made as to whether that sequence has already been translated, INQUIRY 312. If the sequence has not already been translated, it is translated, STEP 314, and placed in a translation cache 316. However, if it has already been translated, then that corresponding translated sequence is found in the translation cache, STEP 318. After finding the translated sequence or translating the sequence, the translated sequence is executed, STEP 320. Processing then continues at INQUIRY 302.

To maximize the efficiency of emulation, nested virtual machines are used. Nested virtual machines may cooperate with each other in order to maximize performance. For example, it is possible to run one VM (such as a JAVA™ virtual machine) on (i.e., nested inside) another VM (such as QEMU IA32 emulator).

In one embodiment, the VMs may incorporate a dynamic translator (e.g., JIT). In an environment in which a VM (inner VM) itself is running on another VM (outer VM), the translation performed by the JIT of the inner VM may need to undergo further translation by the outer VM in order to run with maximum performance. As an example, consider a JAVA virtual machine running inside QEMU (which emulates the IA32 architecture), which itself is running on a real IBM® PowerPC® machine. The inner VM may translate the JAVA bytecode to IA32 native instructions expecting it to run fast. However, these IA32 instructions cannot directly execute on the PowerPC® hardware. The QEMU JIT needs to translate these PowerPC® instructions before they can execute. Thus, in order to improve performance, in accordance with an aspect of the present invention, the inner VM sends the instructions to be translated directly to the outer VM, which translates them directly to its own native architecture and can execute them on behalf of the inner virtual machine. This enables the inner VM to avoid the overhead of unnecessary translation, and improves the throughput of the entire system. This cooperation is further described below.

Figure 4:
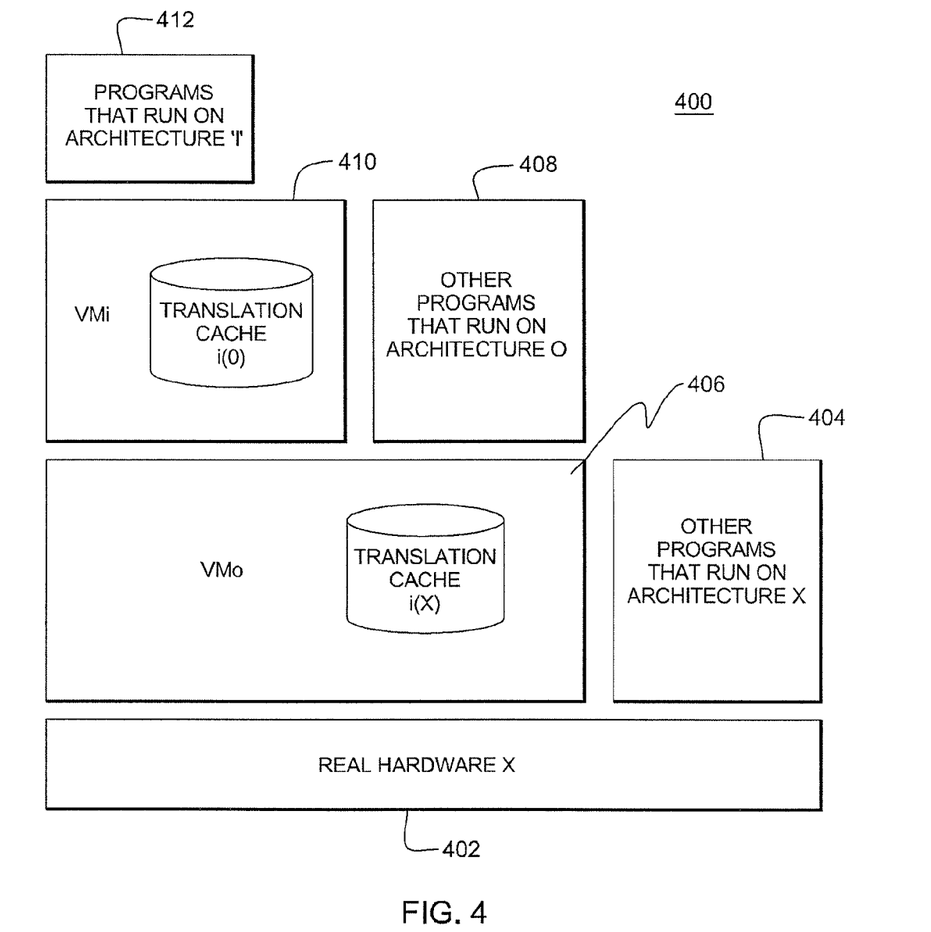
FIG. 4 depicts one embodiment of an environment with nested virtual machines, in accordance with an aspect of the present invention.

One example of nested VMs is depicted in FIG. 4. As shown, a real machine 400 includes real hardware of an architecture, referred to as architecture X, 402. Architecture X can be any of a number of architectures, such as PowerPC® or others. This hardware is capable of executing programs written for architecture X 404. That is, the machine is capable of executing the instruction set of computer architecture X (denoted i(X)). Various programs written in i(X) can run on X. One particular program written in i(X) may be a virtual machine 406 that is capable of executing programs written for an architecture O (VMo). Like architecture X, architecture O can be one of a number of architectures, including, but not limited to, the IA32 architecture. This VM is capable of executing programs written for architecture O 408, while itself is running on a machine (or VM) of architecture X. VMo incorporates a JIT that translates sequences i(O) instructions to sequences i(X) instructions.

In accordance with an aspect of the present invention, a set of programs is capable of running on VMo. One such program may be a virtual machine 410, which is capable of executing programs written for an architecture I (VMi). VMi is capable of executing programs written for architecture I 412, while itself running on a VM (or machine) of architecture O. As one example, architecture I is JAVA™. VMi also incorporates a JIT that translates sequences of i(I) instructions to sequences i(O) instructions. In such an environment, any translated sequence of i(O) instruction produced by VMi is either interpreted one by one by VMo or translated into sequences of i(X) instructions by VMo. This overhead is sub-optimal and this is addressed by one or more aspects of the present invention.

In particular, in the example presented above, a Java Virtual machine (VMi) is running on (nested inside) a QEMU IA32 Emulator (VMo), which itself is running on a real PowerPC machine (X). In such a case, the VMi translates sequences to i(I) instructions (i.e., Java bytecode) into sequences of i(O) instructions (i.e., IA32 instructions). In such an environment any translated sequence of i(O) instructions (i.e., IA32 instructions) produced by VMi is either interpreted one by one by VMo or translated into sequences of i(X) instructions (i.e., PowerPc instructions) by VMo. This overhead could be avoided if the Java bytecode instructions could be translated directly to PowerPC instructions.

In accordance with an aspect of the present invention, the VMs discover and communicate with one another. In one embodiment, this communication is performed via network connections, such as over a network socket or other communications medium. In another embodiment, this communication may be performed via shared memory (e.g., one or more shared memory buffers) or any other type of connection. As one example, the discovery of the outer virtual machine by the inner virtual machine may be achieved by the user manually specifying the identifying network address of the outer virtual machine to the inner virtual machine. In another embodiment, discovery is achieved by an auto-discovery protocol (such as an UPnP protocol, or the Apple Bonjour protocol).

Further, in one example, when the inner VM initializes, it handshakes with the outer VM and the two VMs exchange a list of capabilities, such as, e.g., native and guest architecture of the VM, memory management or garbage collection policies supported. They may also agree on an intermediate representation in which the inner VM will provide instructions or other requests. Alternatively, the outer VM may intrinsically support multiple input instruction forms and internally be able to translate them all to the native instruction set of the outer VM.

Instead of, or in addition to, dynamically translating sequences of i(I) instructions into sequences of i(O) instructions, in accordance with an aspect of the present invention, VMi sends a translation request to VMo requesting that VMo translate the sequence on behalf of VMi. This request may include an identifier of the sequence to be translated or the sequence itself, as examples. VMo translates the sequence to a sequence of i(X) instructions, and then, in one example, passes back to VMi an identifier for the translated block produced by the outer VM. Thereafter, whenever VMi needs to execute a sequence of i(I) instructions that has already been translated, it requests VMo to execute the corresponding translated i(X) sequence on its behalf. For example, it passes back the identifier of the block to the outer VM and requests the outer VM to execute the block. VMo communicates the results of the execution of the sequence back to VMi.

Figure 5:
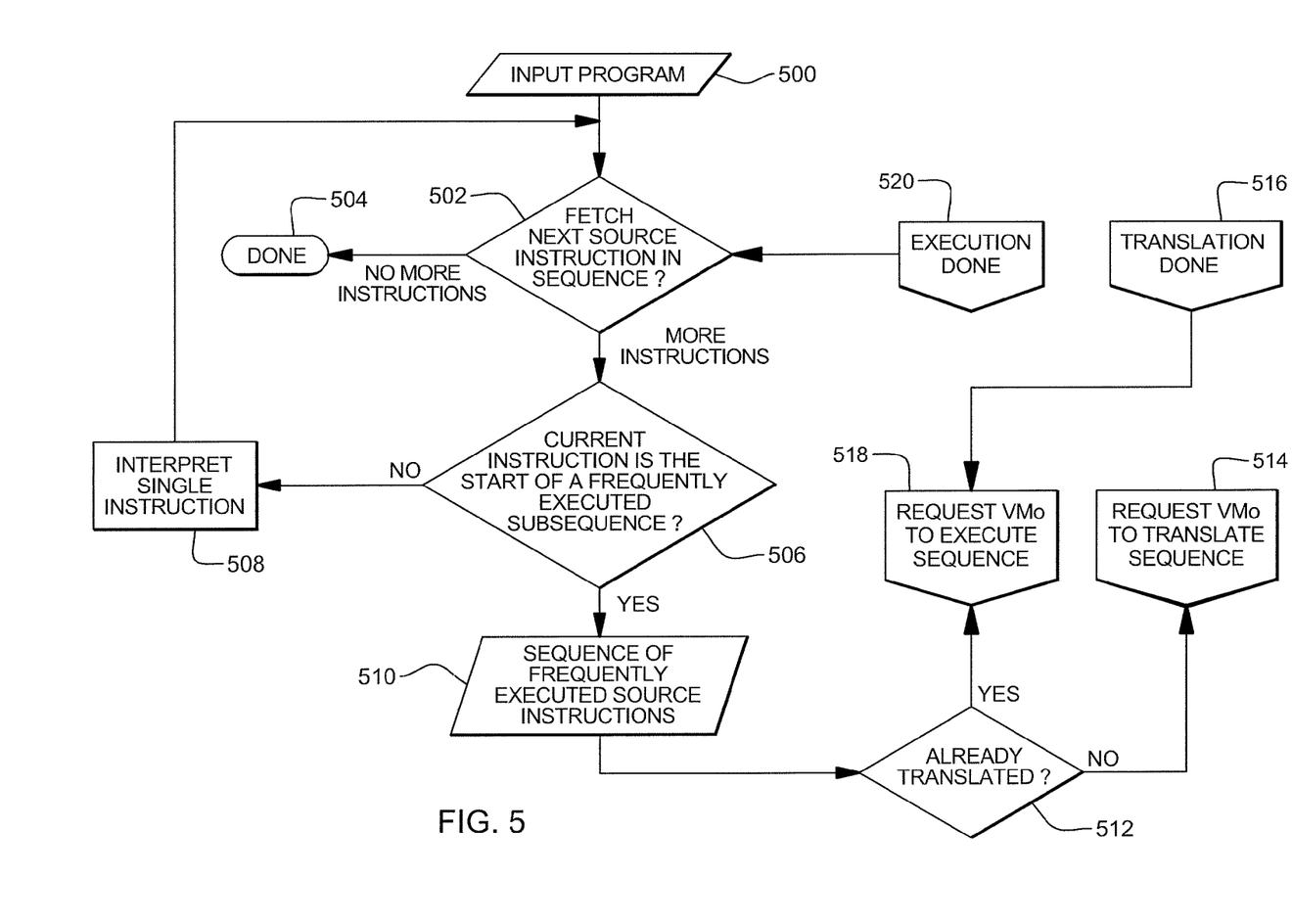
FIG. 5 depicts one embodiment of the operation of an inner virtual machine, in accordance with an aspect of the present invention.

Further details regarding the cooperation between the inner VM and outer VM are described with reference to FIG. 5, in which one embodiment of the operation of the inner VM is described. Initially, a program is input to the inner virtual machine, STEP 500. Then, a determination is made as to whether the next source instruction in the sequence is to be fetched, INQUIRY 502. If there are no more instructions to be fetched, then processing is complete, STEP 504. However, if there is at least one more instruction to be fetched, that instruction is fetched and a determination is made as to whether the current instruction is the start of a frequently executed subsequence of instructions, INQUIRY 506. If the fetched instruction is not the start of a frequently executed subsequence of instructions, then the single instruction is interpreted, STEP 508. Processing then continues at INQUIRY 502.

Returning to INQUIRY 506, if the current instruction is the start of a frequently executed subsequence of instructions, then the sequence of frequently executed source instructions is fetched, STEP 510, and a determination is made as to whether that sequence has already been translated, INQUIRY 512. If the sequence of frequently executed instructions has not already been translated, the VMi requests the VMo to translate the sequence, STEP 514. This processing is described further below with reference to FIG. 6A. When the translation is complete, STEP 516, processing continues at STEP 518. Further, if the sequence of frequently executed source instructions has already been translated, INQUIRY 512, processing continues at STEP 518. At STEP 518, the VMi requests, at some point in time, the VMo to execute the translated sequence, as described in further detail below. When the execution is complete, STEP 520, processing continues at INQUIRY 502.

Figure 6A:
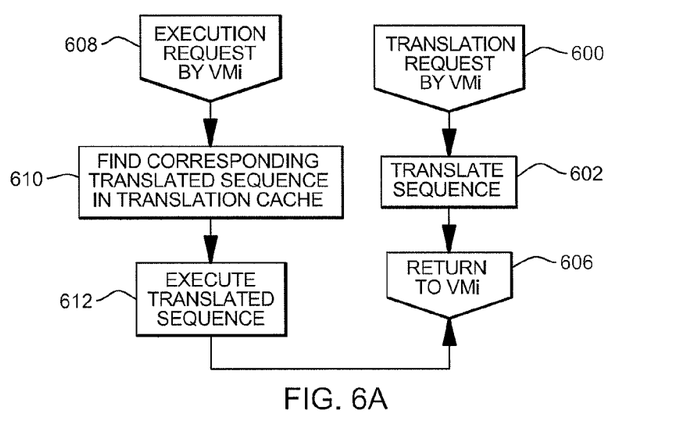
FIG. 6A depicts one embodiment of an operation of an outer virtual machine pursuant to requests by the inner virtual machine, in accordance with an aspect of the present invention.
Figure 6B:
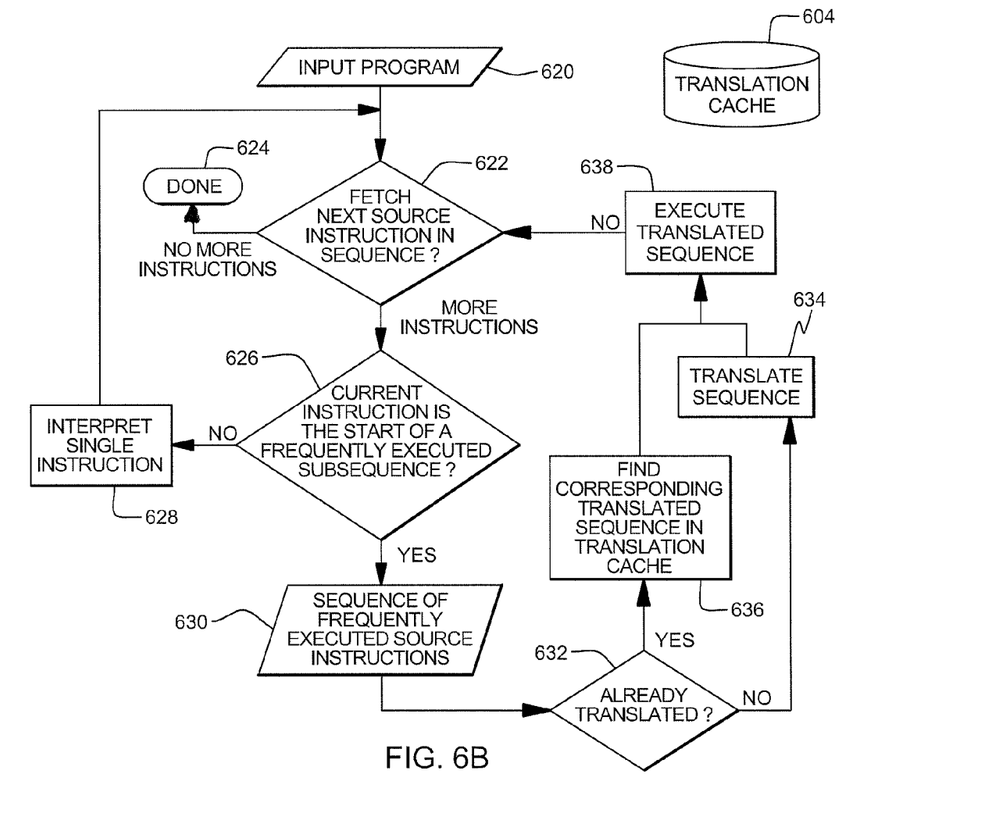
FIG. 6B depicts one embodiment of further operation of the outer virtual machine, in accordance with an aspect of the present invention.

Processing associated with one embodiment of the operation of the outer VM is further described with reference to FIGS. 6A-6B. Referring initially to FIG. 6A, when a translation request by VMi is received, STEP 600, the VMo translates the sequence, STEP 602. The translated sequence is stored in a translation cache, 604 (FIG. 6B). It then returns an indication of completion to the VMi, along with an identifier for the translated sequence, STEP 606 (FIG. 6A).

Similarly, when the VMo receives an execution request by the VMi, STEP 608, the VMo finds the corresponding translated sequence in the translation cache, STEP 610. It then executes the translated sequence, STEP 612, and indicates to the VMi that the execution is complete, STEP 606.

In the above embodiment, the VMo translates and executes sequences of instructions for the VMi. In another example, the VMi may request the VMo to interpret and execute one or more single instructions.

In addition to performing translation and execution on behalf of the VMi, the VMo also translates and executes instructions on its own behalf. This is described with reference to FIG. 6B. Initially, a program is input to the virtual machine, STEP 620. Then, a determination is made as to whether the next source instruction in the sequence is to be fetched, INQUIRY 622. If there are no more instructions to be fetched, then processing is complete, STEP 624. However, if there is at least one more instruction to be fetched, that instruction is fetched and a determination is made as to whether the current instruction is the start of a frequently executed subsequence of instructions, INQUIRY 626. If the fetched instruction is not the start of a frequently executed subsequence of instructions, then the single instruction is interpreted, STEP 628. Processing then continues at INQUIRY 622.

Returning to INQUIRY 626, if the current instruction is the start of a frequently executed subsequence of instructions, then the sequence of frequently executed source instructions is fetched, STEP 630, and a determination is made as to whether that sequence has already been translated, INQUIRY 632. If the sequence has not already been translated, it is translated, STEP 634, and placed in translation cache 604. However, if it has already been translated, then that corresponding translated sequence is found in the translation cache, STEP 636. After finding the translated sequence or translating the sequence, the translated sequence is executed, STEP 638. Processing then continues at INQUIRY 622.

In FIGS. 6A and 6B, a translate sequence step is shown. It should be noted that the same logic can be used for both translation steps, even though the steps are shown separately therein. The same is true for the other duplicative steps shown. Further, one piece of logic could perform a plurality of the steps shown.

Described in detail above is a capability that enables an inner VM to send a communication, such as a request to translate a sequence of instructions, to an outer VM which translates the instructions directly in its own native architecture and/or executes them on behalf of the inner virtual machine.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 7:
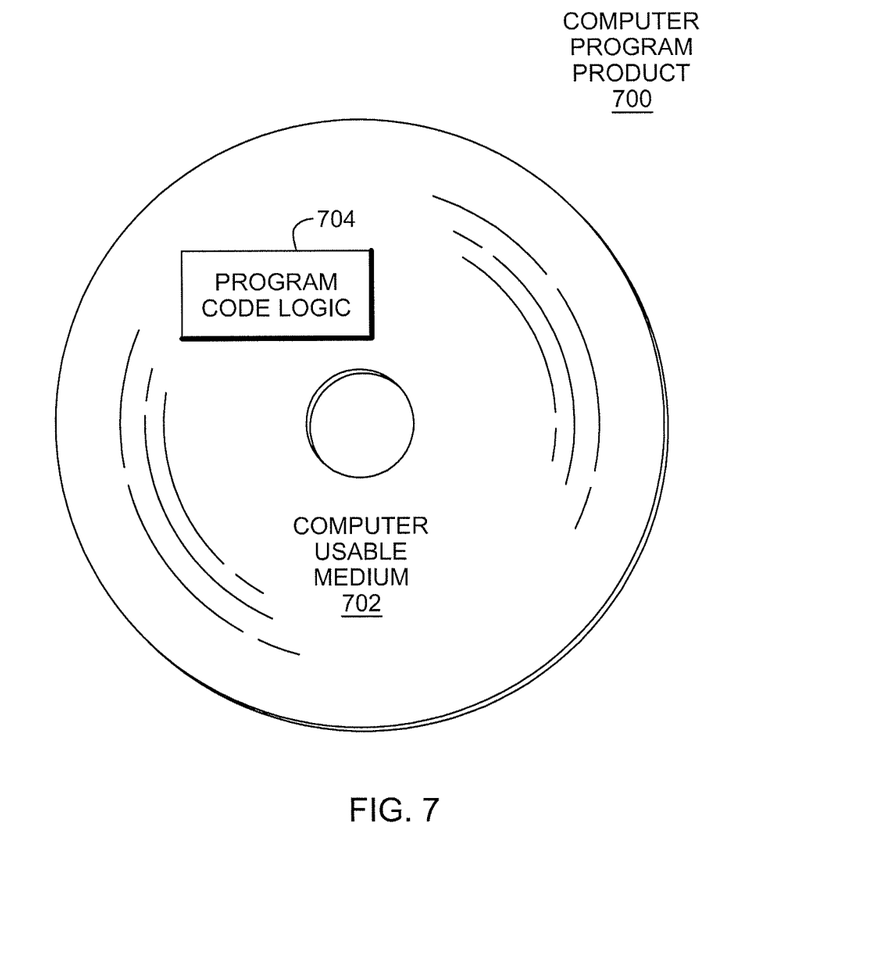
FIG. 7 depicts one embodiment of a computer program product incorporating one or more aspects of the present invention.

One example of an article of manufacture or a computer program product incorporating one or more aspects of the present invention is described with reference to FIG. 7. A computer program product 700 includes, for instance, one or more computer usable media 702 to store computer readable program code means or logic 704 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided to improve the performance of nested VMs, and therefore, the overall system. An outer VM receives a communication from an inner VM (e.g., a request including an indication, such as an address of one or more instruction to be translated; a request including one or more instructions themselves to be translated; or another communication, as examples) and performs one or more tasks based on the communication. The task is performed directly be the outer VM for the inner VM, thereby improving efficiency. For example, the outer VM translates a sequence of instructions for the inner VM, instead of having the inner VM translate the instructions once and then having those instructions translated again by the outer VM. The one translation is avoided. Advantageously, performance is improved by cooperation between the VMs. Knowledge about the underlying real processor is used to perform runtime operations more efficiently. By dispatching the runtime tasks to bypass the virtual environments and run on the real system, the overhead of these tasks can be reduced significantly. As one example, more efficient JIT compiled code is provided that is generated to match the hardware instead of the outer virtual machine.

Further advantages are realized, in one embodiment, in that the dispatched function is executed on the same physical device (and thus, consuming the same underlying computational resources) on which the inner and outer VMs are running.

Although various embodiments are described above, these are only examples. For instance, there may be more than two VMs nested inside each other and any inner VM may communicate with any outer VM. Further, although examples of architectures are provided, these are only examples. Other architectures may also be used. Moreover, even though in the examples herein the outer VM has a different architecture than the inner VM, in other examples, at least one inner VM may have the same architecture as at least one outer VM. Many other additions, deletions, revisions may be provided and are considered within the scope of the claimed invention.

As further examples, an inner VM may request tasks other than translation to be performed by an outer VM. The requests made by the VMi can be communicated to the VMo in any manner. The examples provided herein are not meant to be limiting in any manner. Moreover, communications other than requests may be sent by the inner VM and received by the outer VM.

Translation may be performed in a number of different ways. Further, dynamic translators other than JIT may be used. Yet further, the determination of whether an instruction is the start of a frequently executed sequence of instructions may be performed in any number of ways.

Execution of the translated sequence does not necessarily have to be right after translation. There may be a delay between requesting translation and execution or execution may occur substantially immediately after translation.

In on or more aspects of the present invention, various emulators can be used. Emulators are commercially available and offered by various companies. Additional details relating to emulation are described in *Virtual Machines: Versatile Platforms for Systems and Processes* (*The Morgan Kaufmann Series in Computer Architecture and Design*), Jim Smith and Ravi Nair, Jun. 3, 2005, which is hereby incorporated herein by reference in its entirety.

Further, the processing environment can include multiple central processing units, each having one or more VMs and providing a guest operating system and guest applications. Additionally, the processing environment can include processing units that are based on architectures other than Power4, Power PC® or Intel®. Additionally, servers other than pSeries® servers can incorporate and use one or more aspects of the present invention.

Even further, in one or more embodiments, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method to facilitate translation of computer instructions, said method comprising:
   receiving, by an outer virtual machine of a computing environment, a translation request from an inner virtual machine of the computing environment to translate on behalf of the inner virtual machine at least one instruction of an architecture of the inner virtual machine and indicative of a function to be performed, wherein the inner virtual machine is running on the outer virtual machine;
   translating, by the outer virtual machine, the at least one instruction of the architecture of the inner virtual machine to at least one translated instruction of a native architecture on which the outer virtual machine runs, wherein the native architecture and an architecture of the outer virtual machine are different architectures such that the native architecture is unable to directly execute instructions of the architecture of the outer virtual machine, and wherein the architecture of the outer virtual machine and the architecture of the inner virtual machine are different architectures such that the architecture of the outer virtual machine is unable to directly execute instructions of the architecture of the inner virtual machine; and
   based on receiving, by the outer virtual machine, an execution request from the inner virtual machine to execute the at least one translated instruction on behalf of the inner virtual machine, initiating, by the outer virtual machine, execution of the at least one translated instruction.

2. The method of claim 1, wherein the at least one translated instruction is executed by the outer virtual machine on behalf of the inner virtual machine.

3. The method of claim 1, wherein the translation request comprises at least one of an indication of the at least one instruction to be translated or the at least one instruction to be translated.

4. The method of claim 1, further comprising:
   obtaining by the inner virtual machine an indication of existence of the outer virtual machine; and
   obtaining by the outer virtual machine an indication of existence of the inner virtual machine.

5. A computer program product for facilitating translation of computer instructions, said computer program product comprising:
a non-transitory computer readable storage medium readable by a processor and storing instructions for execution by the processor for performing a method comprising:
receiving, by an outer virtual machine of a computing environment, a translation request from an inner virtual machine of the computing environment to translate on behalf of the inner virtual machine at least one instruction of an architecture of the inner virtual machine and indicative of a function to be performed, wherein the inner virtual machine is running on the outer virtual machine;
translating, by the outer virtual machine, the at least one instruction of the architecture of the inner virtual machine to at least one translated instruction of a native architecture on which the outer virtual machine runs, wherein the native architecture and an architecture of the outer virtual machine are different architectures such that the native architecture is unable to directly execute instructions of the architecture of the outer virtual machine, and wherein the architecture of the outer virtual machine and the architecture of the inner virtual machine are different architectures such that the architecture of the outer virtual machine is unable to directly execute instructions of the architecture of the inner virtual machine; and
based on receiving, by the outer virtual machine, an execution request from the inner virtual machine to execute the at least one translated instruction on behalf of the inner virtual machine, initiating, by the outer virtual machine, execution of the at least one translated instruction.

6. The computer program product of claim 5, wherein the architecture of the inner virtual machine is different than both the native architecture and the architecture of the outer virtual machine such that the architecture of the outer virtual machine and the native architecture are each unable to directly execute instructions of the architecture of the inner virtual machine.

7. The computer program product of claim 5, wherein the method further comprises providing an identifier of the at least one translated instruction to the inner virtual machine.

8. The computer program product of claim 5, wherein the at least one translated instruction is executed by the outer virtual machine on behalf of the inner virtual machine.

9. The computer program product of claim 7, wherein the execution request to execute the at least one translated instruction includes the identifier of the at least one translated instruction to be executed.

10. The computer program product of claim 5, wherein the translation request comprises an indication of the at least one instruction to be translated.

11. The computer program product of claim 5, wherein the translation request comprises the at least one instruction to be translated.

12. The computer program product of claim 5, wherein the method further comprises:
obtaining by the inner virtual machine an indication of existence of the outer virtual machine; and
obtaining by the outer virtual machine an indication of existence of the inner virtual machine.

13. The computer program product of claim 12, wherein the method further comprises exchanging an indication of one or more capabilities between the outer virtual machine and the inner virtual machine.

14. The computer program product of claim 5, wherein the at least one instruction comprises a sequence of frequently executed instructions of the architecture of the inner virtual machine indicative of one or more functions to be performed, wherein the translating translates the sequence of instructions to a translated sequence of instructions of the native architecture, and wherein the executing comprises executing the translated sequence of instructions by the outer virtual machine.

15. The computer program product of claim 14, wherein the method further comprises, prior to receiving the execution request from the inner virtual machine, storing, by the outer virtual machine, the translated sequence of instructions in a translation cache to facilitate execution of the translated sequence of instructions multiple times absent multiple translations of the sequence of instructions by the outer virtual machine.

16. A computer program product for facilitating processing within a computing environment, said computer program product comprising:
a non-transitory computer readable storage medium readable by a processor and storing instructions for execution by the processor for performing a method comprising:
receiving, by an outer virtual machine of a computing environment, a communication from an inner virtual machine of the computing environment to perform a task on behalf of the inner virtual machine, said outer virtual machine and said inner virtual machine cooperating with one another, wherein the inner virtual machine is running on the outer virtual machine and wherein an architecture of the inner virtual machine is of a different architecture than an architecture of the outer virtual machine such that the architecture of the outer virtual machine is unable to directly execute instructions of the architecture of the inner virtual machine;
performing the task by the outer virtual machine based on the communication, said task related to improving performance of the computing environment and comprising performing a translation of at least one instruction of the architecture of the inner virtual machine to at least one translated instruction of a native architecture on which the outer virtual machine runs, wherein the native architecture and the architecture of the outer virtual machine are different architectures such that the native architecture is unable to directly execute instructions of the architecture of the outer virtual machine; and
based on receiving, by the outer virtual machine, an execution request from the inner virtual machine to execute the at least one translated instruction on behalf of the inner virtual machine, initiating, by the outer virtual machine, execution of the at least one translated instruction.

17. The computer program product of claim 16, wherein the architecture of the inner virtual machine is different than both the native architecture and the architecture of the outer virtual machine such that the architecture of the outer virtual machine and the native architecture are each unable to directly execute instructions of the architecture of the inner virtual machine.

18. A computer system for facilitating translation of computer instructions, said computer system comprising:
   a memory; and
   a processor in communications with the memory, wherein the computer system is configured to perform a method, said method comprising:
      receiving, by an outer virtual machine of a processor of a computing environment, a translation request from an inner virtual machine of the computing environment to translate on behalf of the inner virtual machine at least one instruction of an architecture of the inner virtual machine and indicative of a function to be performed, wherein the inner virtual machine is running on the outer virtual machine;
      translating, by the outer virtual machine, the at least one instruction of the architecture of the inner virtual machine to at least one translated instruction of a native architecture on which the outer virtual machine runs, wherein the native architecture and an architecture of the outer virtual machine are different architectures such that the native architecture is unable to directly execute instructions of the architecture of the outer virtual machine, and wherein the architecture of the outer virtual machine and the architecture of the inner virtual machine are different architectures such that the architecture of the outer virtual machine is unable to directly execute instructions of the architecture of the inner virtual machine; and
      based on receiving, by the outer virtual machine, an execution request from the inner virtual machine to execute the at least one translated instruction on behalf of the inner virtual machine, initiating, by the outer virtual machine, execution of the at least one translated instruction.

19. The computer system of claim 18, wherein the at least one translated instruction is executed by the outer virtual machine on behalf of the inner virtual machine.

20. The computer system of claim 18, wherein the translation request comprises at least one of an indication of the at least one instruction to be translated or the at least one instruction to be translated.

* * * * *